United States Patent Office 3,354,232
Patented Nov. 21, 1967

3,354,232
HIGH TEMPERATURE, SHORT-CONTACT-TIME PYROLYSIS OF CHLORODIFLUOROMETHANE
John Richard Soulen, Narberth, Pa., and William Henry Chappell, Jr., Delran, N.J., assignors to Pennsalt Chemicals Corporation, Philadelphia, Pa., a corporation of Pennsylvania
No Drawing. Filed Oct. 20, 1965, Ser. No. 499,073
6 Claims. (Cl. 260—653)

ABSTRACT OF THE DISCLOSURE

Chlorodifluoromethane ($CHClF_2$) is pyrolyzed at a temperature within the range of about 1300° C. to about 2000° C. for a period of from 0.0001 to 0.06 second to produce, as one of the major products, 1,2-dichlorotetrafluoroethane ($CClF_2CClF_2$).

---

This invention relates to the preparation of other organic fluorochloro and fluoro compounds by the pyroylsis of chlorodifluoromethane. More particularly, this invention concerns pyrolyzing chlorodifluoromethane ($CHClF_2$)

to produce, as the major products, 1,2-dichlorotetrafluoroethane ($CClF_2CClF_2$), dichlorodifluoromethane ($CCl_2F_2$)

trifluorochloromethane ($CClF_3$) and tetrafluoroethylene ($CF_2=CF_2$). By "pyrolysis" is meant the transformation of a compound into another compound or other compounds through the agency of heat alone, and therefore the term includes not only the rearrangement of a compound but also the making of more complex compounds.

F. B. Downing, A. F. Benning and R. C. McHarness, U.S. Patent No. 2,384,821, pyrolyzed $CHClF_2$ at temperatures between 400° C. and 1000° C. to produce octafluorocyclobutane ($C_4F_8$). In U.S. Patent No. 2,551,5573, the same experimenters teach that the pyrolysis of $CHClF_2$ at 600° C. to 1000° C. results in the formation of $CF_2=CF_2$, $CClF_2CHF_2$, $C_4F_8$ and compounds of the series $H(CF_2)_nCl$ in which $n$ is at least 3. It is highly significant that 1,2-dichlorotetrafluoroethane ($CClF_2CClF_2$)

was not produced by the aforesaid processes.

It has now been discovered that high temperature pyrolysis of $CHClF_2$, i.e., in the range of from about 1300° C. to about 2000° C., unexpectedly produces $CClF_2CClF_2$ as a principal reaction product, and as other principal products of secondary importance, $CF_2=CF_2$, $CCl_2F_2$ and $CClF_3$, and as products in minor amounts, $CHF_3$ and $CClF_2CClF_2$. However, the time of pyrolysis reaction embodied herein is very short and should not exceed about 0.06 second.

The most desired product of the process of this invention, $CClF_2CClF_2$, is a valuable refrigerant used mainly in systems having centrifugal rotary compressors. The product $CF_2=CF_2$ is a well known starting material for preparing useful polymers. The products, $CCl_2F_2$, $CClF_3$, $CHF_3$ and $CClF_2CClF_2$, also are well-known refrigerants and, moreover, $CCl_2F_2$ and $CClF_3$ also can be pyrolyzed at high temperatures and short contact times to produce additional $CClF_2CClF_2$ as set forth in the copending applications of J. R. Soulen and W. F. Schwartz, Ser. No. 497,535, filed Oct. 18, 1965, and Ser. No. 499,084, filed Oct. 20, 1965, respectively.

As stated above, the pyrolysis of $CHClF_2$ is carried out according to this invention at a temperature within the range of about 1300° C. to about 2000° C. The preferred temperature range for obtaining the highest yields of $CClF_2CClF_2$ is from about 1450° C. to about 1700° C.

As earlier stated, in combination with the high pyrolysis temperatures employed in the practice of this invention, very short contact times of the $CHClF_2$ at such temperatures are used, that is, contact times of the order of about 0.0001 to 0.06 second, preferably in the range of about 0.0003 to about 0.03 second, more preferably to about 0.01 second. This is in marked contrast to the relatively long contact times previously employed in the pyrolyses of $CHClF_2$. For example, in the earlier mentioned U.S. Patents Nos. 2,384,821 and 2,551,573, the contact times for pyrolyzing $CHClF_2$ at 700° C. was of the order of 0.3 to 8 seconds. (See Examples I and XVIII of U.S. 2,384,821 and Examples I, II, VIII and XIII of U.S. 2,551,573.) With contact times of the usual order of magnitude used previously in the pyrolysis of fluorochloromethanes, the process of this invention is generally inoperative because of degradation of the reactant and reaction products. As used herein, contact time is defined as follows:

$$\text{contact time (seconds)} = \frac{\text{heated reactor volume}}{\text{volume of gas per second (calculated at reaction temperature and pressure) fed to reactor}}$$

The short contact times indicated above for the pyrolysis of this invention correspond to very high space velocities ranging from about 500 to about 100,000 per hour which permit a high rate of feed of reactant and reduce reactor volume needed. Space velocity is defined as volumes of reactant (measured at standard temperature and pressure (STP) i.e., 0° C. and 760 mm. Hg) per volume of heated reactor per hour.

The reaction pressure in the present process is not critical and may be atmospheric, subatmospheric, or superatmospheric. Superatmospheric pressures may range, e.g., up to about 10 atmospheres. However, atmospheric and subatmospheric pressure operation will generally be found most convenient. As a practical limit, pressures lower than about one mm. Hg abs. are not recommended. Preferred operating pressures will generally range from about 10 mm. Hg to atmospheric pressure.

The pyrolysis is conveniently carried out by continuously passing a stream of the $CHClF_2$ feed through an elongated tube preferably having a high ratio of wall area to cross-sectional area so that heat may be rapidly and continuously transferred from the heated reactor walls to the gaseous reactant. The reactor should be constructed of a material resistant to attack by the reactant and reaction products at the high operating temperaures. Materials of this type include for example inert graphite, boron nitride, platinum, platinum alloys such as platinum-rhodium, and common metals lined with platinum or platinum alloys. The reactor can be heated to the desired reaction temperatures in any suitable manner such as by electrical induction heating or by placing the reactor in an electrically heated furnace.

The products of the pyrolysis reaction passing from the reactor are cooled and usually will be scrubbed in caustic solution or other alkaline solution to remove acidic inorganic by-products such as chlorine, HCl and HF. The organic products are separated from the reaction mixture in a conventional manner by fractional distillation. The unreacted $CHClF_2$ can, of course, be recovered for recycling purposes.

Examples 1–3

In the experiments herein described, specific embodiments of the invention are set forth to illustrate and clarify the invention.

TABLE I.—PYROLYSIS OF CHClF$_2$
[Pyrolysis conditions: Pressure—50 mm. Hg abs.; contact time—0.001 to 0.01 second; temperature—see below]

| Example | Temperature, °C. | Percent conversion of CHClF$_2$ | Weight Percent in Recovered Converted Products of— | | | | | |
|---|---|---|---|---|---|---|---|---|
| | | | CClF$_2$CClF$_2$ | CF$_2$=CF$_2$ | CCl$_2$F$_2$ | CClF$_3$ | CHF$_3$ | CCl$_2$FCClF$_2$ |
| 1 | 1,380 | 90 | 10 | 63 | 8 | | 4 | 9 |
| 2 | 1,500 | 99 | 35 | 4 | 22 | 21 | 15 | 2 |
| 3 | 1,500–1,600 | >90 | 49 | | 27 | 8 | | *3 |

*Products of Ex. 3 also contained 5 wt. percent of CClF$_2$CF$_3$ and 3 wt. percent of CCl$_3$F.

Gaseous CHClF$_2$ is passed continuously at a measured rate through a 1/8" I.D. x 1/2" O.D x 13" long, inert graphite tube reactor centered within a 2" diameter "Vycor" high-silica quartz tube, 15" long. The reactor is inductively heated with a 3 1/4" long load coil of 12 turns of 1/4" copper tubing about the "Vycor" tube, the power for said coil supplied by a high frequency generator with a maximum output of 7.5 kilowatts operating at 450 kilocycles. The effective reaction zone in the tube is thus 3 1/4 inches. The temperature of the reactor is measured with an optical pyrometer focused on the center of the heated portion of the tube. Examination of the inert graphite reactor after repeated runs therein reveals that its inner surface is unaffected by the passage of the hot gases therethrough.

The product mixture passes from the reactor and is condensed in a trap cooled with liquid nitrogen. The condenser is vented to a mechanical vacuum pump which maintains the subatmospheric reaction pressure employed in these examples. After completion of the run, the reaction products are warmed to room temperature and transferred to an evacuated stainless steel cylinder.

The reaction products are then passed through a series of scrubbers containing aqueous solutions of sodium hydroxide to remove inorganic byproducts. The organic reaction products are analyzed using gas-liquid chromatographic and infrared analyses techniques. The data from three runs are summarized in Table I.

Example 4

The procedure of the preceding examples is repeated using an 80% platinum-20% rhoduim alloy tube as the pyrolysis reactor. The pyrolysis temperature is about 1350° C., the pressure is 20 mm. Hg and the contact time is 0.001 second (space velocity=18,000 per hour). 93.4% of the CHClF$_2$ fed is converted via the pyrolysis reaction. The principal products are CClF$_2$CClF$_2$ (8.5 weight percent), CF$_2$=CF$_2$ (70%), CCl$_2$F$_2$ (7%) and CHF$_3$ (5.5%).

It is to be understood that the foregoing illustrative examples are not to be construed as limitative of the scope of the invention which is defined by the appended claims.

We claim:
1. The method which comprises pyrolyzing chlorodifluoromethane at a temperature of from about 1300° C. to about 2000° C. wherein the pyrolysis time is from about 0.0001 to about 0.06 second, a major product of the pyrolysis being 1,2-dichlorotetrafluoroethane.
2. The method of claim 1 wherein the pyrolysis temperature is from about 1450° C. to about 1700° C.
3. The method of claim 1 wherein the pyrolysis time is from about 0.0003 to about 0.03 second.
4. The method which comprises pyrolyzing chlorodifluoromethane at a temperautre of from about 1450 to about 1700° C., wherein the pyrolysis time is from about 0.0003 to about 0.01 second, a major product of the pyrolysis being 1,2-dichlorotetrafluoroethane.
5. The method of pyrolyzing chlorodifluoromethane which comprises passing chlorodifluoromethane through a tube heated to a temperature of from about 1300° C. to about 2000° C., wherein the contact time is within the range of about 0.0001 to about 0.06 second, a major product of the pyrolysis being 1,2-dichlorotetrafluoroethane.
6. The method of pyrolyzing chlorodifluoromethane which comprises passing chlorodifluoromethane through a tube heated to a temperature of from about 1450° C. to about 1700° C., wherein the contact time is within the range of about 0.0003 to about 0.03 second, a major product of the pyrolysis being 1,2-dichlorotetrafluoroethane.

References Cited

UNITED STATES PATENTS

| 2,558,624 | 6/1951 | Murray | 260—653 |
| 3,009,966 | 11/1961 | Hauptschein et al. | 260—653.5 |
| 3,188,356 | 6/1965 | Hauptschein et al. | 260—653.5 |

DANIEL D. HORWITZ, *Primary Examiner*.